A. ROSENSTENGEL AND E. E. POAGE.
RAKE.
APPLICATION FILED APR. 28, 1919.
1,326,097.
Patented Dec. 23, 1919.
2 SHEETS—SHEET 1.
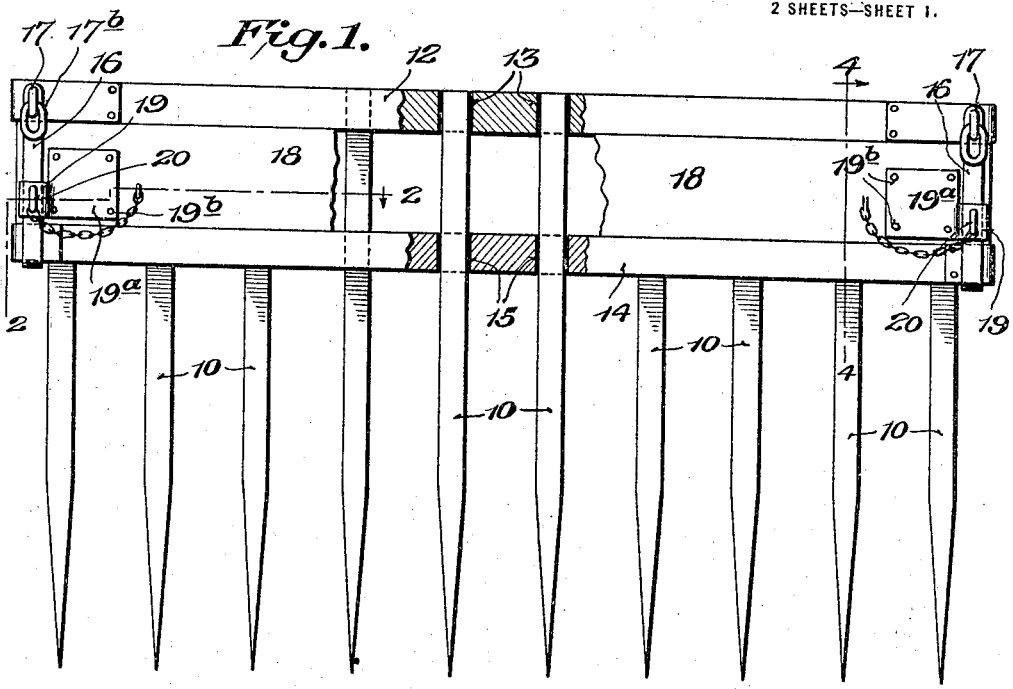
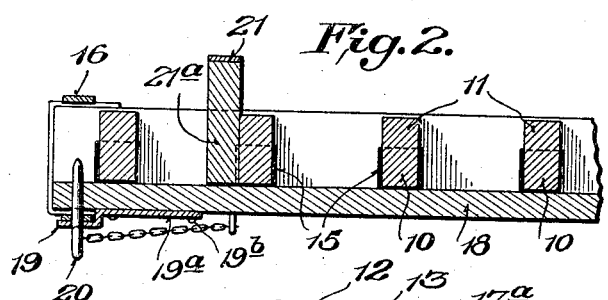
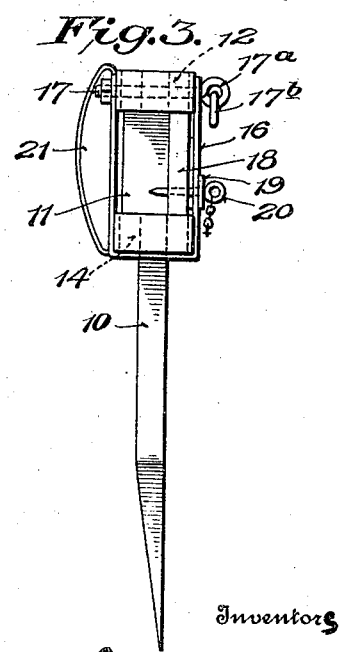
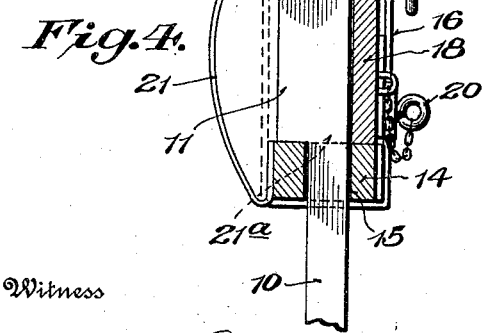
Witness
Chas L. Griesbaum
Inventors
Albert Rosenstengel,
Edward E. Poage,
By Royal E. Burnham,
Attorney

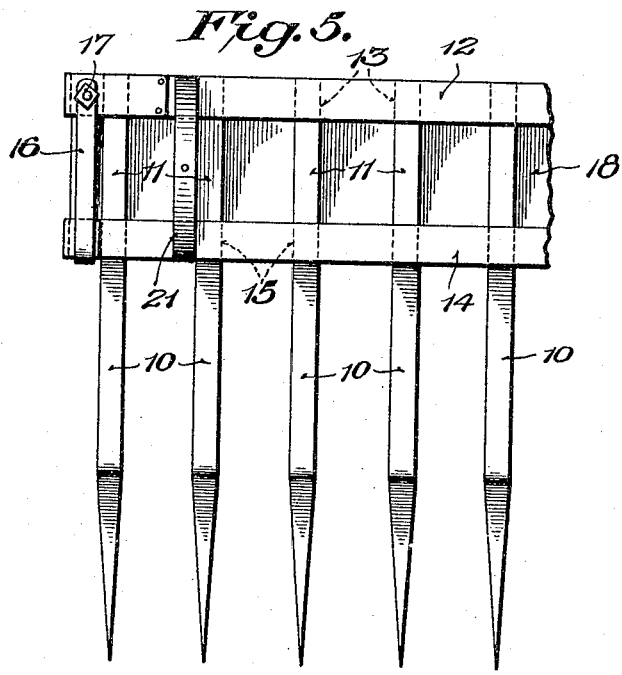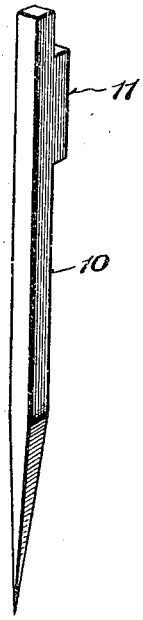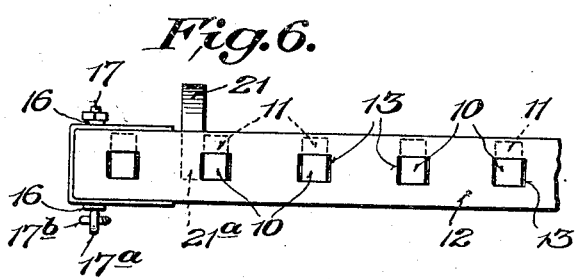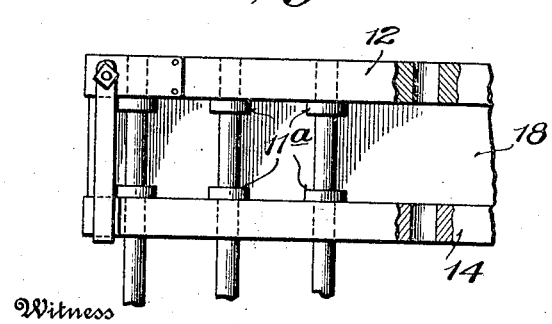

UNITED STATES PATENT OFFICE.

ALBERT ROSENSTENGEL AND EDWARD E. POAGE, OF HANNIBAL, MISSOURI.

RAKE.

1,326,097.　　　　　　　　Specification of Letters Patent.　　　Patented Dec. 23, 1919.

Application filed April 28, 1919. Serial No. 293,191.

*To all whom it may concern:*

Be it known that we, ALBERT ROSENSTENGEL and EDWARD E. POAGE, citizens of the United States, residing at Hannibal, in the county of Marion and State of Missouri, have invented certain new and useful Improvements in Rakes, of which the following is a specification, reference being had therein to the accompanying drawings.

This invention relates to toothed agricultural implements, and particularly to rakes, in which parts may be easily assembled and disassembled.

It is an object of the invention to provide improvements in rakes and other toothed implements, whereby any or all of the teeth may be removed from the head without the necessity of employing special tools, so that in the case of large implements the parts may be readily disassembled to facilitate transportation and storage and in all sizes of such implements individual damaged or worn teeth may be removed and replaced with facility.

When read in connection with the description herein, the details of construction and arrangement of parts contemplated by the invention will be apparent from the accompanying drawings, forming part hereof, wherein an embodiment of the invention, as applied to a rake unit adapted to be used as a part of an animal or power propelled agricultural implement, is disclosed, for purposes of illustration.

While the disclosures herein exemplify what now is considered to be a preferable embodiment of the invention, it is to be understood that it is not the intention to be limited necessarily thereto in interpretation of the claims, as modifications and adaptations within the limits of the claims can be made without departing from the nature and spirit of the invention.

Like reference-characters refer to corresponding parts in the views of the drawings, of which—

Figure 1 is a view of the upper or front side of a rake unit, certain parts being broken away;

Fig. 2 is a fragmentary longitudinal sectional view;

Fig. 3 is an end view;

Fig. 4 is a transverse sectional view;

Fig. 5 is a view of the under or rear side;

Fig. 6 is a fragmentary top view;

Fig. 7 is a view of one of the teeth;

Fig. 8 is a view of another form of tooth; and

Fig. 9 is a fragmentary view showing a head associated with a tooth of the form disclosed by Fig. 8.

Having more particular reference to the drawings, 10 designates teeth carried by a head. Each of the teeth, which in one form is a rectangular in cross section, has an enlarged portion 11 extending from near the upper end for a comparatively short distance and constituting abutments; or each tooth, particularly if it is round in cross section as shown by Figs. 8 and 9, may be formed with annular flanges $11^a$, one of which is located near the upper end of the tooth and the other being spaced therefrom.

The teeth are held in working position by a head. One part of the head is an upper transverse bar or member 12, having a series of equally-spaced recesses or orifices 13 in which the upper ends of the teeth are seated, the abutments on the teeth nearer to their upper ends bearing against its lower side. A corresponding lower transverse bar or member 14 of the head has openings 15 through which the teeth extend, and the upper side of this bar bears against the lower abutments of the teeth.

The two bars or members 12 and 14 are held tightly against the abutments of the teeth by clamps, one at each end of the head, pivotally mounted on one of the bars or transverse members, and arranged to be swung onto and off of the end portions of the other. In the embodiment disclosed, metallic straps 16 constitute the clamps, and each of them is pivoted to the upper bar or member on a bolt 17 extending therethrough. The bolts may be formed with eyes $17^a$, which may be engaged by links $17^b$ or other suitable means for connecting the rake unit to the implement of which it is a part.

In order to contribute to the rigidity of the head and to relieve the teeth of strain that might be imposed thereon by tendency of the bars to move longitudinally with respect to each other, and at the same time to prevent accumulation of raked matter between the bars, a flat member 18 is located between the bars over the intervening portions of the teeth and extends substantially the length of the bars. This filling member is of a width corresponding to the distance between the sides of the tooth-abutments against which the bars bear; and, therefore, the bars bear against its side edges when the clamps are in closed positions. The clamps overlap the end portions of the filling member, and for each of the clamps that member has a lug 19 arranged to have the clamp disposed thereunder when in closed position; and a removable lock-pin 20 is disposed through the lug and clamp and into the member to hold the clamp in that position. Usually, with a view to avoiding unnecessary weight, the filling member is of wood, and each of the lugs 19 is a part of a plate 19$^a$ secured to the member by suitable fastenings 19$^b$.

For the purpose of keeping the head off of the ground, it is provided with shoes 21, one located near each end. Each of these shoes is formed integrally with an extension 21$^a$ which is disposed between the bars and secured to the side of one of the teeth. The shoes and the teeth are secured together in any suitable manner, and the shoes may be removed from the device with the teeth to which they are attached.

Ordinarily, and preferably, the bars 12 and 14 are of the same formation, in order to keep at a minimum the number of dissimilar parts and thereby facilitate manufacture and the replacement of worn and damaged parts, and in order also to permit the interchange of the positions of the two bars, if that is found desirable in service; and, for the same reasons, all of the teeth for a given head are substantially of the same characteristics.

When it is desired to take down a unit such as hereinbefore described, the clamps are opened, the filling member or plate is removed, the upper bar is withdrawn from the upper ends of the teeth, and any or all of the teeth then may be withdrawn from the lower bar, others substituted therefor, and the parts again brought to assembled and locked positions; or the parts may be permitted to remain disassembled and available for easy loading on a vehicle for transportation and storage in a small space, as desired.

It will be seen that no special tools are required for the operation of assembly and disassembly. Indeed, no tools at all are required, unless there is very tight binding at places, and then only tools, such as pliers or a spike and a hammer, are needed to dislodge the locking-pins and to knock the clamps and other parts loose and again bring them to assembled positions.

The holding means herein disclosed is adapted particularly for wooden teeth, and the parts of the head ordinarily are of wood, except the clamps and the elements immediately associated therewith. The arrangement is such that it is not necessary to form holes in and to pass bolts through the teeth and thereby weaken them and make them more liable to decay; employment of bolts and the attendant liability of their becoming loosened in service are avoided in all parts of the unit, except the bolts on which the clamps are pivoted and which are used at the same time for connecting the unit to the implement of which it is a part; and it is unnecessary to bring any metallic parts whatever into contact with the teeth, and thus there is avoidance of the liability of metal adversely affecting the integrity of the teeth.

Although the invention is directed primarily to a wooden toothed unit, it also is adapted in principle to such a unit formed partially or entirely of metallic elements, and Figs. 8 and 9 exemplify such an adaptation by disclosing a suitable form of metallic tooth. With such a tooth, the bars may be either of wood or metal, but preferably they would be of the latter material. However, if desired, a wooden tooth might be formed substantially as disclosed by Fig. 8.

Having thus described our invention, what we claim as new, and desire to secure by Letters Patent, is—

1. A unit of the class described comprising a head including two separable transverse members having recesses therein, teeth extending through the recesses of one of said members and having end portions seated in those of the other, abutments on said teeth, and clamps mounted on one of said members and adapted to engage the other member and to maintain the two members against said abutments.

2. A unit of the class described comprising a head including two separable transverse members, teeth extending through one of said members and having end portions seated in the other, a filling-piece lying on and removable from the portions of the teeth between said members, abutments on said teeth, and means whereby said members are held against said filling-piece and said abutments.

3. A unit of the class described comprising a head including two separable transverse members having recesses therein, a filling piece between said members, teeth extending through recesses of one of said members and having end portions seated in recesses of the other, abutments on said teeth, and clamps mounted on one of said members adapted to engage the other member and overlap said filling piece and to hold the members against the abutments and the filling piece.

4. A unit of the class described comprising a head including two separable transverse members having recesses therein, a filling piece between said members, teeth extending through recesses of one of said members and having end portions seated in recesses of the other, abutments on said teeth, clamps pivotally mounted on one of said members adapted to engage the other member and overlap said filling piece and to hold the members against the abutments and the filling piece, and pins arranged to extend through said clamps into said filling piece whereby to maintain the parts in assembled positions.

5. A unit of the class described comprising a head including two separable transverse members having recesses therein, a filling piece between said members, teeth extending through recesses in one of said members and having end portions seated in recesses of the other, abutments on said teeth, clamps pivotally mounted on one of said members adapted to engage the other member and overlap said filling piece and to hold the members against the abutments and the filling piece, lugs on said filling piece overlapping said clamps when in locked positions, and pins arranged to extend through said lugs and clamps into said filling piece to maintain the parts in assembled positions.

In testimony whereof we affix our signatures.

ALBERT ROSENSTENGEL.
EDWARD E. POAGE.